United States Patent [19]
Venezia

[11] 3,993,387

[45] Nov. 23, 1976

[54] ELECTRICAL CONNECTOR AND METHOD OF MAKING SAME

[75] Inventor: J. William Venezia, Andover, N.J.

[73] Assignee: Amerace Corporation, New York, N.Y.

[22] Filed: Nov. 25, 1974

[21] Appl. No.: 526,613

[52] U.S. Cl. .......... 339/59 R; 29/629; 174/73 R; 339/111; 339/DIG. 3

[51] Int. Cl.² .......... H01R 13/52

[58] Field of Search .......... 174/73; 339/59–61, 339/111, 143, DIG. 3; 29/628, 629, 630 A

[56] References Cited

UNITED STATES PATENTS

| | | | |
|---|---|---|---|
| 2,323,399 | 7/1943 | Jacobi | 174/73 R |
| 3,352,962 | 11/1967 | Brown et al. | 174/73 R |
| 3,808,352 | 4/1974 | Johnson | 174/73 R |

*Primary Examiner*—Roy Lake
*Assistant Examiner*—Neil Abrams
*Attorney, Agent, or Firm*—S. Michael Bender; Arthur Jacob

[57] ABSTRACT

An electrical connector in which a sleeve-like insert of conductive elastomeric material serves as an internal shield, the insert terminating at a rounded end made by folding the wall of the insert upon itself at that end to establish the desired rounded profile contour and to space the terminal edge of the wall away from the rounded end in the direction along the insert toward the other end thereof.

25 Claims, 6 Drawing Figures

ELECTRICAL CONNECTOR AND METHOD OF MAKING SAME

The present invention relates generally to electrical connections and pertains, more specifically, to electrical connector elements for use in high voltage power distribution systems and to a method for making such connector elements.

In recent years, increased emphasis has been placed upon the development of underground electrical power distribution systems, especially in light industrial, commercial and residential areas. Various power distribution components, such as shielded electrical cables, transformers and electrical connectors have been evolved for use in such systems.

Among these components, shielded electrical connectors have been developed which include premolded component parts that are assembled easily in the field at the terminal ends of electrical cables so as to facilitate the fabrication of electrical connections and enable increased ease in the construction and installation of underground power distribution systems. The numerous advantages of such connectors have given rise to a demand for connectors of the same type which will operate successfully under even higher voltages than those voltages already accommodated by earlier connectors.

One critical factor in the construction of such connector elements and the use of these connector elements in electrical connections is the effect of electrical stresses upon air trapped within the connector or the connection. Because the connectors and connections are assembled in the field from individual component parts, air can be trapped at locations along the various mating surfaces. Electrical stress across trapped air can cause corona and lead to deleterious effects upon the integrity of the insulation of the connector element. Any concentration of electrical stress at these locations would have exceptionally deleterious effects. Operation under even higher voltage conditions further aggravates any potential stress concentration problems.

Internal shielding arrangements have been developed for alleviating potentially harmful electrical stresses at critical locations. However, operation at increased voltages requires still further innovation to cope with potential problems in the vicinity of the internal shield.

It is therefore an object of the invention to provide an electrical connector element having an internal shield structure which protects against deleterious effects that could arise from the presence of trapped air at certain locations within the connector element during service.

Another object of the invention is to provide a method for making the electrical connector described above.

Still another object of the invention is to provide an electrical connector element in which an internal shielding system is so constructed as to tend to eliminate entrapped air from electrically stressed areas while tolerating some trapped air in alternate areas where critical stress is not present.

A further object of the invention is to provide a method for making an electrical connector having such an internal shielding system.

A still further object of the invention is to provide a method for making an electrical connector element having an internal shield configuration which tends to alleviate the concentration of electrical stress at critical locations in the connector element.

Another object of the invention is to provide an electrical connector element construction including an insert of conductive elastomeric material having a structure enabling simplified fabrication of a shielding system which protects against deleterious effects arising from the presence of air which can be trapped within the connector element and alleviates harmful concentration of electrical stresses at critical locations in the connector element.

The above objects, as well as still further objects and advantages, are attained by the invention which may be described briefly as an improvement in an electrical connector element and in making an electrical connector element having a sleeve-like insert of conductive elastomeric material serving as an internal shield within an integral surrounding member of insulating elastomeric material, the insert having terminal ends, fabricating the insert with at least one end having a wall portion extended longitudinally beyond the desired location of the terminal end to a terminal edge, and folding the extended wall portion upon itself to form a fold which establishes the corresponding terminal end of the insert, while spacing the terminal edge away from the terminal end in the direction along the insert toward the other end thereof. Preferably, the extended wall portion is folded in such a way as to establish a rounded profile contour at the corresponding terminal end of the insert The invention will be more fully understood, while still further objects and advantages thereof will become apparent, in the following detailed description of a preferred embodiment illustrated in the accompanying drawing, in which:

Figure 1:
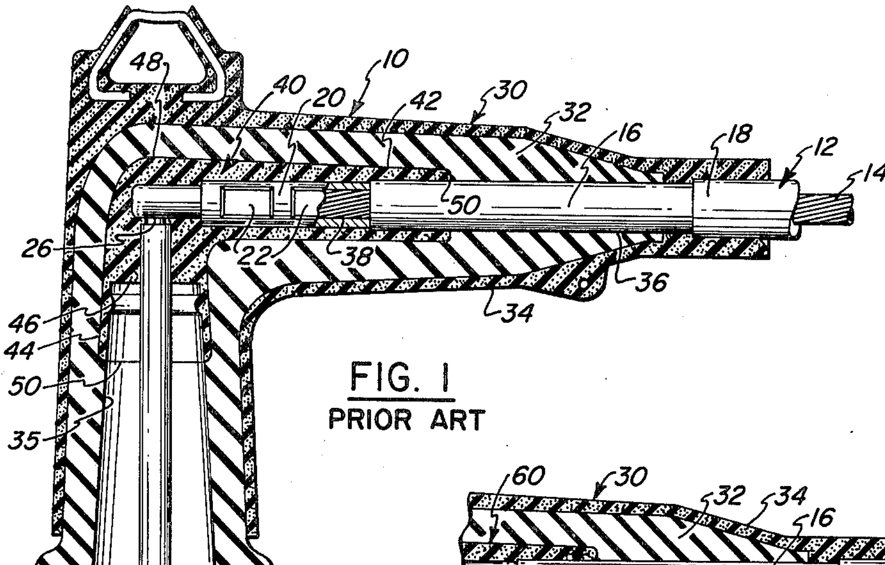
FIG. 1 is a cross-sectional view of a typical electrical connector element constructed in accordance with the prior art and affixed to the terminal end of a high voltage shielded cable in a power distribution system.

Referring now to the drawing, and especially to FIG. 1 thereof, an electrical connector element constructed in accordance with the prior art is illustrated in the form of elbow connector 10 shown installed at the terminal end of a high voltage shielded cable 12 for use in a power distribution system. Cable 12 has a central conductor 14 surrounded by an insulating jacket 16 which itself lies within an external shield 18. An electrical contact 20 is affixed to conductor 14, as by crimping the contact at 22, and a contact pin 24 is attached to contact 20 by a threaded connection at 26.

Elbow connector 10 includes a housing 30 of elastomeric material, the housing 30 having a composite construction including an inner portion 32 of an insulating elastomeric material and an outer portion 34 of a conductive elastomeric material. The inner and outer portions 32 and 34 form an integral composite structure. A recess 35 provides a receptacle within which a complementary bushing, or plug member, will be received in a completed connection.

Connector 10 may be installed at the terminal end of cable 12 in the field, as follows. A portion of the outer shield 18 is removed to expose a length 36 of the insulating jacket 16 and a portion of the jacket 16 is removed to expose a length 38 of conductor 14. The contact 20 is then crimped onto length 38 of conductor 14 and the housing 30 is slipped over the contact 20 and the end of the cable 12 and pushed along the cable until the housing is seated upon the cable, as shown. In this manner, the outer shield 18 of the cable is contacted by outer portion 34 of the housing to continue the shield electrically along the connector 10. Subsequently, the pin 24 is threaded into the contact 20 to complete the connector.

In order to preclude subjecting to electrical stress any air which may become entrapped in the vicinity of the contact 20 and pin 24, housing 30 is provided with an inner shield in the form of an insert 40 of conductive elastomeric material. Insert 40 is molded integral with the inner portion 32 of housing 30 so as to become a part of the composite structure of the housing. Thus, any air trapped between the contact 20 or pin 24 and the insert 40 is surrounded by essentially equal potential and is not subjected to electrical stress. The insert 40 is extended at one end 42 beyond the contact 20 and along the jacket 16 of the cable to assure that no electrical stress concentration occurs at the area of transition from the contact 20 to the jacket 16. Likewise, the insert 40 is extended at the other end 44 partly along the recess 35 to assure that any air trapped between the bottom 46 of the recess and the mating plug member or bushing of a complementary connector element will not be subjected to electrical stress in a completed connection.

In the fabrication of housing 30, the insert 40 is first molded as a separate part and is then placed upon a mandrel so that inner portion 32 subsequently can be molded around the insert. By molding the portion 32 around the insert 40, the juncture 48 between the insert 40 and the portion 32 can be made void-free, thus eliminating harmful effects which could occur as a result of electrical stresses across any void along the juncture 48. However, difficulties can arise at the boundary 50 between each terminal end of the insert 40 and the surrounding portion 32 of the housing. Should there be any discontinuity along either boundary, the result can give rise to a void and, since there is likely to be some concentration of electrical stress at the transition points marked by boundaries 50, air trapped in the void can be stressed to an undesirable extent. For example, it is likely that a certain amount of flash will be present at the terminal ends of the insert 40, as a result of molding the insert separately. Should the flash not be trimmed properly, discontinuities and concomitant voids could exist. Hence, it becomes necessary to trim the flash carefully and take precautions to assure a smooth transition from the terminal ends of the insert 40 to the surrounding housing portion 32. Such trimming operations not only become critical to successful performance of the connector element, but add extra steps, with concomitant increased costs, in the manufacture of the connector element.

Turning now to FIGS. 2 through 6, there is illustrated an insert 60 constructed in accordance with the invention, as an alternative to insert 40, for use in practicing the method of the invention in the fabrication of a connector which is otherwise identical to connector 10. Except for insert 60, and the elements thereof, the various parts of the connector of FIGS. 2 through 6 will be referred to using the same reference characters as those employed in the above description of connector 10 in connection with FIG. 1.

Insert 60 is a sleeve-like structure molded of a conductive elastomeric material and includes an internal passage having a first leg 62, for receiving the contact 20, and a second leg 64, for receiving the pin 24 of the completed connector. As in insert 40, a recess 66 forms a part of the receptacle which will receive a complementary connector element and a portion 68 of internal passage leg 62 will receive the insulating jacket 16 of the cable to which the connector will be affixed.

Figure 2:
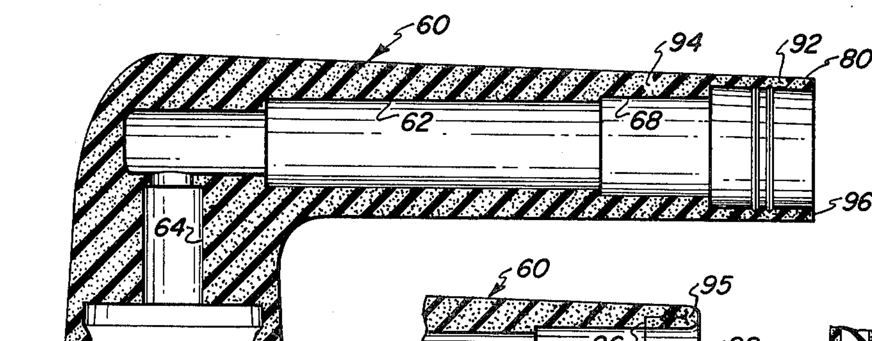
FIG. 2 is an enlarged cross-sectional view of an insert constructed in accordance with the invention for use in an electrical connector element of the type illustrated in FIG. 1.
Figure 3:
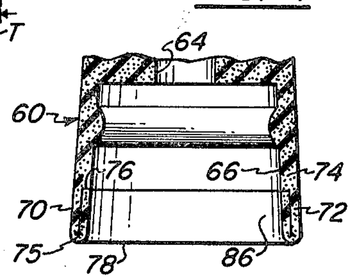
Figure 5:
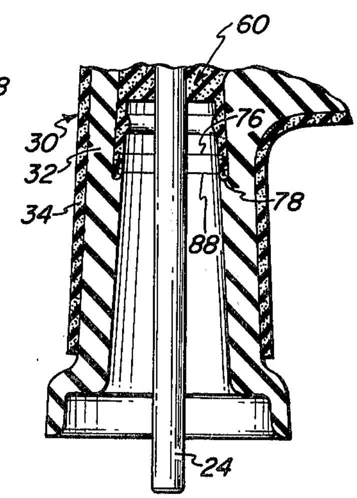

As best seen in FIG. 2, end 70 of the insert 60 is molded with a wall portion 72 extended longitudinally beyond the desired terminal end of the insert and having a wall thickness that is less than the thickness of the wall portion 74 which is contiguous with extended wall portion 72. Upon completion of the molding of insert 60, and prior to molding the inner portion 32 of the connector around the insert 60, the extended wall portion 72 is folded inwardly upon itself, as illustrated in FIG. 3, to form a fold 75. In this manner, the terminal edge 76 of the extended wall portion is placed at a location spaced away from the new terminal end 78 of the insert established at fold 75 in the direction toward the other end 80 of the insert. Thus, any discontinuity in the terminal edge 76, whether due to flash or another irregularity ordinarily associated with the end of a molded element, is placed within the protective envelope of the shielding system provided by the insert. New terminal end 78 presents a smooth, continuous surface which extends between the outer surface and inner surface of the insert and which will become a smooth, continuous juncture between insert 60 and inner portion 32 of the connector, as seen in FIG. 5. Score lines 82 and 84 are provided in order to facilitate folding of extended wall portion 72 and delineate a well-defined flap 86 which is tucked into the internal passage of the insert to complete the recess 66. Thus, critical and expensive trimming steps are not required.

In addition to the smooth, continuous surface provided at end 78, it is noted that the end becomes rounded. It has been found that a rounded end at the terminal end of the internal shield system in a completed connector is desirable from the standpoint of grading the pattern of electrical stress to preclude deleterious concentration of electrical stresses in the vicinity of the end 78. Moreover, as best seen in FIG. 5, the rounded contour of end 78 permits the insulating material of the inner portion 32 of the housing 30 to pass beneath the end 78 of the insert so that the boundary 88 between the conductive material of insert 70 and the insulating material of the inner portion 32 is spaced slightly from end 78 in the direction toward end 80. In this manner, any void or other irregularity at the boundary is made to lie within the envelope of the insert and is not subjected to deleterious electrical stress. The score lines 82 and 84 aid in the control of the particular surface contour attained at end 78.

Preferably, extended wall portion 72 is contiguous with wall portion 74 of insert 60 at a location offset radially with respect to the inner surface of the insert by a distance corresponding to the wall thickness of flap 86 so that after folding, the flap will be flush with the inner surface of the insert. Thus, as illustrated in FIG. 2, offset distance D is equal to wall thickness T. In the illustrated embodiment, wall thickness T of flap 86 is one-half the thickness S of the contiguous wall portion 74. However, since flap 86 is to be located within the shield envelope provided by insert 60, variations in relative wal thicknesses can be accommodated without deleterious electrical effects. Hence, while flap 86 is shown flush with the inner surface of the insert, after folding as seen in FIG. 3, such a flush relationship, while desirable, is not essential. Likewise, while terminal edge 76 abuts wall portion 74, upon folding flap 86 as seen in FIG. 3, a gap between terminal edge 76 and wall portion 74 would not create a harmful electrical condition.

Flap 86 may be retained in the folded position in a variety of ways. One way is to rely upon cold vulcanization which would take place as a result of heat and pressure between the contiguous surfaces of flap 86 and wall portion 72 after folding and during the molding of inner portion 32 around the insert 60. An alternate way is the application of an adhesive to these contiguous surfaces for holding the flap in the folded position.

Figure 6:
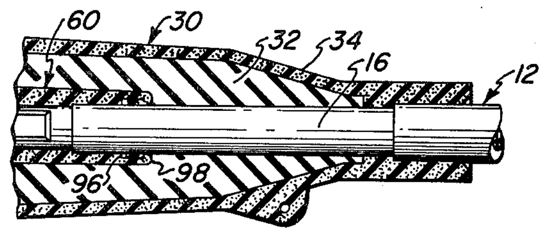
FIGS. 5 and 6 are fragmentary cross-sectional views of end portions of an electrical connector element of the type shown in FIG. 1, but including the insert of FIGS. 2–4.
Figure 4:
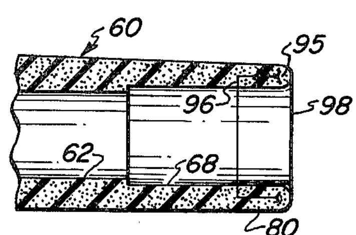
FIGS. 3 and 4 are fragmentary cross-sectional views illustrating the terminal ends of the insert of FIG. 2 at a subsequent step in the method of the invention.

Referring now to FIGS. 2, 4 and 6, end 80 of insert 60 is constructed similar to end 70 in that an extended wall portion 92 has a wall thickness less than the wall thickness of portion 94 which is contiguous with extended wall portion 92. Extended wall portion 92 is subsequently folded inwardly upon itself, as illustrated in FIG. 4, to establish fold 95 and to place terminal edge 96 at a location spaced away from the new terminal end 98 of the insert in the direction toward the other end 70 of the insert. New terminal end 98 presents a smooth, continuous surface which extends between the outer surface and inner surface of insert 60 and which is rounded. Upon molding the inner portion 32 around the insert, as seen in FIG. 6, the internal passage is completed for the reception of insulating jacket 16 of the cable 12. Thus, an internal shielding system is provided for the completed connector, the shielding system having terminal ends 78 and 98 of improved construction and configuration for added protection against the deleterious effects of electrical stresses at higher operating voltages.

It is to be understood that the above detailed description of an embodiment of the invention is provided by way of example only. Various details of design and construction may be modified without departing from the true spirit and scope of the invention as set forth in the appended claims.

The embodiments of the invention in which an exclusive property or privilege is claimed are defined as follows:

1. A method of making an electrical connector element having a sleeve-like insert of conductive elastomeric material serving as an internal shield and a member of insulating elastomeric material, the insert having terminal ends; said method comprising the steps of:

fabricating the insert with at least one end having a wall portion extended longitudinally beyond the desired location of the terminal end to a terminal edge;

folding the extended wall portion upon itself to form a fold which establishes the corresponding terminal end of the insert, while spacing said terminal edge away from said terminal end in the direction along the insert toward the other end thereof; and providing said member of insulating material joined to said insert in such manner that the juncture therebetween is continuous and void-free, including the portion of said juncture between said member of insulating material and said corresponding terminal end of the insert.

2. The invention of claim 1 wherein the extended wall portion is folded in such a way as to establish a rounded profile contour at said corresponding terminal end of the insert.

3. The invention of claim 1 wherein the extended wall portion is made with a wall thickness less than the thickness of the portion of the wall of the insert contiguous with said extended wall portion.

4. The invention of claim 3 wherein the insert has inner and outer surfaces and the extended wall portion is offset radially with respect to one of said surfaces by a distance corresponding to the wall thickness of the part of the wall portion to be folded such that the folded part becomes flush with said one of the surfaces.

5. The invention of claim 4 wherein said one of the surfaces is the inner surface.

6. The invention of claim 5 wherein the extended wall portion is folded in such a way as to establish a rounded profile contour at said corresponding terminal end of the insert.

7. The invention of claim 4 wherein the extended wall portion has a wall thickness of about one-half the thickness of the portion of the wall of the insert contiguous with the extended wall portion and the offset distance is about one-half the distance between the inner and outer surfaces.

8. The invention of claim 7 wherein said one of the surfaces is the inner surface.

9. The invention of claim 8 wherein the extended wall portion is folded in such a way as to establish a rounded profile contour at said corresponding terminal end of the insert.

10. The invention of claim 1 wherein the insert has an internal passage and the extended wall portion is turned inwardly into the passage upon folding.

11. The invention of claim 10 wherein the extended wall portion is folded in such a way as to establish a rounded profile contour at said corresponding terminal end of the insert.

12. The method of claim 1 wherein said step of providing said member of insulating material comprises the step of molding said insulating member about said insert.

13. The article formed by practicing the method of claim 12.

14. The article formed by practicing the method of claim 1.

15. An electrical connector element comprising an inner sleeve-like insert of conductive elastomeric material serving as an internal shield, the insert having terminal ends, at least one of said terminal ends being located at a fold in a wall portion folded upon itself, said fold establishing said one terminal end, and said wall portion including a terminal edge spaced from said terminal end in the direction along the insert toward the other terminal end, and an outer member of insulating elastomeric material, said member of insulating elastomeric material being joined to said insert in such manner that the juncture therebetween is continuous and void-free, including the portion of said juncture between said member of insulating material and said corresponding one terminal end of the insert.

16. The invention of claim 15 wherein said one terminal end has a rounded profile contour.

17. The invention of claim 15 wherein the folded wall portion has a wall thickness less than the thickness of the portion of the wall of the insert contiguous with said folded wall portion.

18. The invention of claim 15 wherein the insert has an internal passage and the wall portion is folded such that the terminal edge is juxtaposed with the internal passage.

19. The invention of claim 18 wherein said one terminal end has a rounded profile contour.

20. The invention of claim 15 wherein the insert has inner and outer surfaces and the folded wall portion is unitary with the portion of the wall of the insert contiguous with the folded wall portion at a location offset radially with respect to one of said surfaces by a distance corresponding to the thickness of the folded part of the folded wall portion such that the folded part of the folded wall portion is flush with said one of the surfaces.

21. The invention of claim 20 wherein said one of the surfaces is the inner surface.

22. The invention of claim 20 wherein said one terminal end has a rounded profile contour.

23. The invention of claim 20 wherein the folded wall portion has a wall thickness of about one-half the thickness of the portion of the wall of the insert contiguous with the folded wall portion and the offset distance is about one-half the distance between said inner and outer surfaces.

24. The invention of claim 23 wherein said one terminal end has a rounded profile contour.

25. The invention of claim 20 wherein said member of insulating elastomeric material surrounds said insert.

* * * * *